Figure 1:
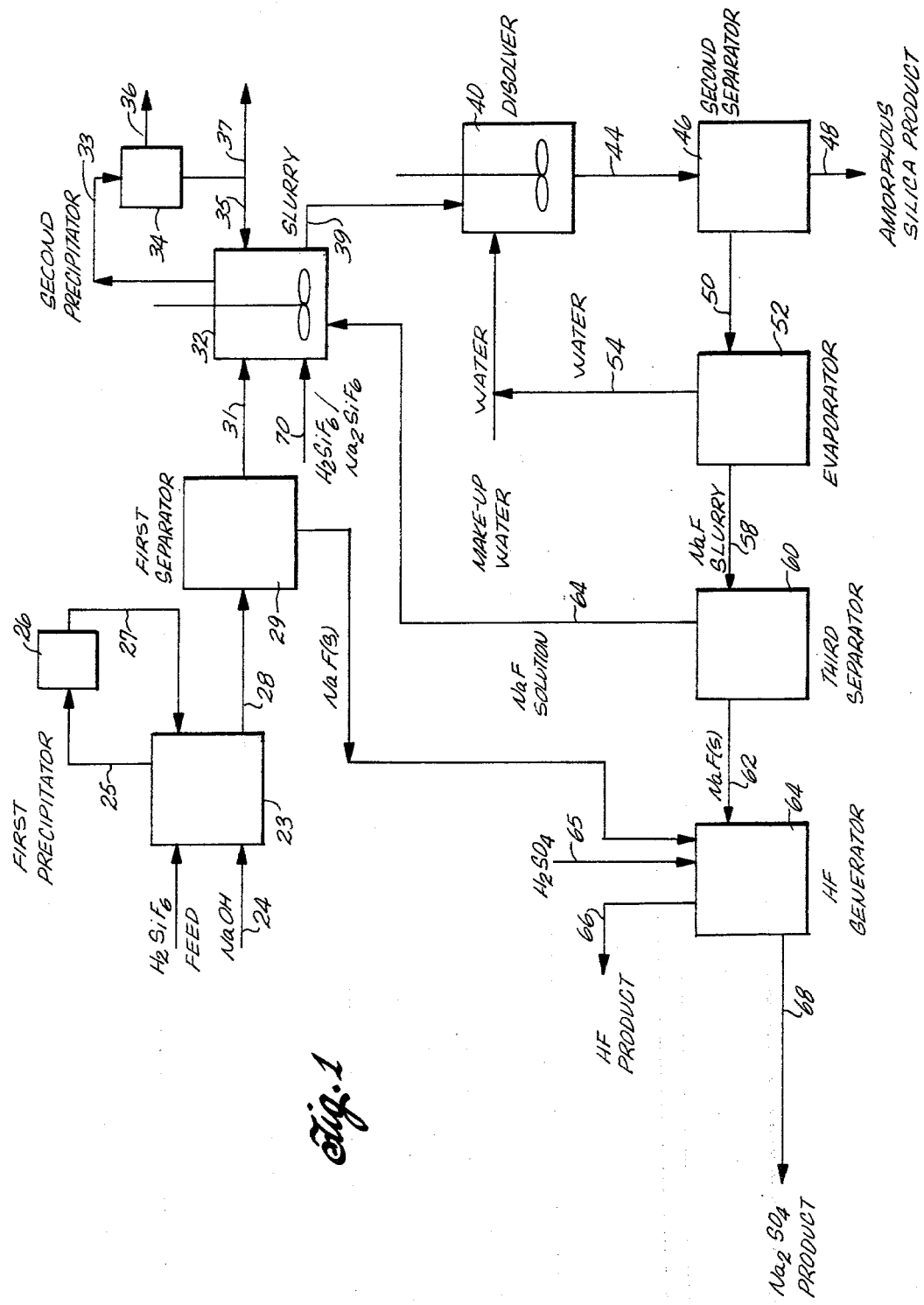

United States Patent [19]

Sikdar et al.

[11] 4,213,951
[45] Jul. 22, 1980

[54] RECOVERY OF HYDROFLUORIC ACID FROM FLUOSILICIC ACID WITH HIGH PH HYDROLYSIS

[75] Inventors: Subhas K. Sikdar, San Juan Capistrano; James H. Moore, La Verne, both of Calif.

[73] Assignee: Occidental Research Corporation, Irvine, Calif.

[21] Appl. No.: 953,802

[22] Filed: Oct. 23, 1978

[51] Int. Cl.$^2$ .................. C01B 33/12; C01B 7/22; C01D 3/02
[52] U.S. Cl. .................. 423/339; 423/332; 423/483; 423/484; 423/490
[58] Field of Search .............. 423/332, 339, 483, 484, 423/490

[56] References Cited

U.S. PATENT DOCUMENTS

| 3,061,541 | 10/1962 | Henry . | |
|---|---|---|---|
| 3,278,265 | 10/1966 | Quarles . | |
| 3,506,394 | 4/1970 | Okamura et al. | |
| 3,537,817 | 11/1970 | Bacheland . | |
| 3,549,317 | 12/1970 | Dorn et al. ......................... | 423/339 |
| 3,689,216 | 9/1972 | Brown . | |
| 3,755,532 | 8/1973 | Harrison et al. . | |
| 3,878,294 | 4/1975 | Schabacher et al. . | |
| 3,914,398 | 10/1975 | Faust . | |

FOREIGN PATENT DOCUMENTS

| 46-20134 | 6/1971 | Japan ....................... | 423/483 |
|---|---|---|---|
| 49-10595 | 3/1974 | Japan ....................... | 423/490 |
| 647395 | 12/1950 | United Kingdom ............... | 423/490 |

*Primary Examiner*—Jack Cooper
*Attorney, Agent, or Firm*—Barry A. Bisson

[57] ABSTRACT

Hydrofluoric acid is recovered from fluosilicic acid by reacting fluosilicic acid with sodium hydroxide to form a first slurry having a pH of from about 11 to about 14, the first slurry containing sodium metasilicate and precipitated sodium fluoride. Sodium fluoride is recovered from the first slurry leaving a first solution which is reacted with sodium fluosilicate or fluosilicic acid or both to form a second slurry comprising silica and dissolved sodium fluoride. The reaction occurs under such conditions that the second slurry contains precipitated amorphous silica. The precipitated amorphous silica is separated from the second slurry leaving a second solution of sodium fluoride. Sodium fluoride is recovered from the second solution. Recovered sodium fluoride is reacted with sulfuric acid to produce hydrogen fluoride.

29 Claims, 2 Drawing Figures

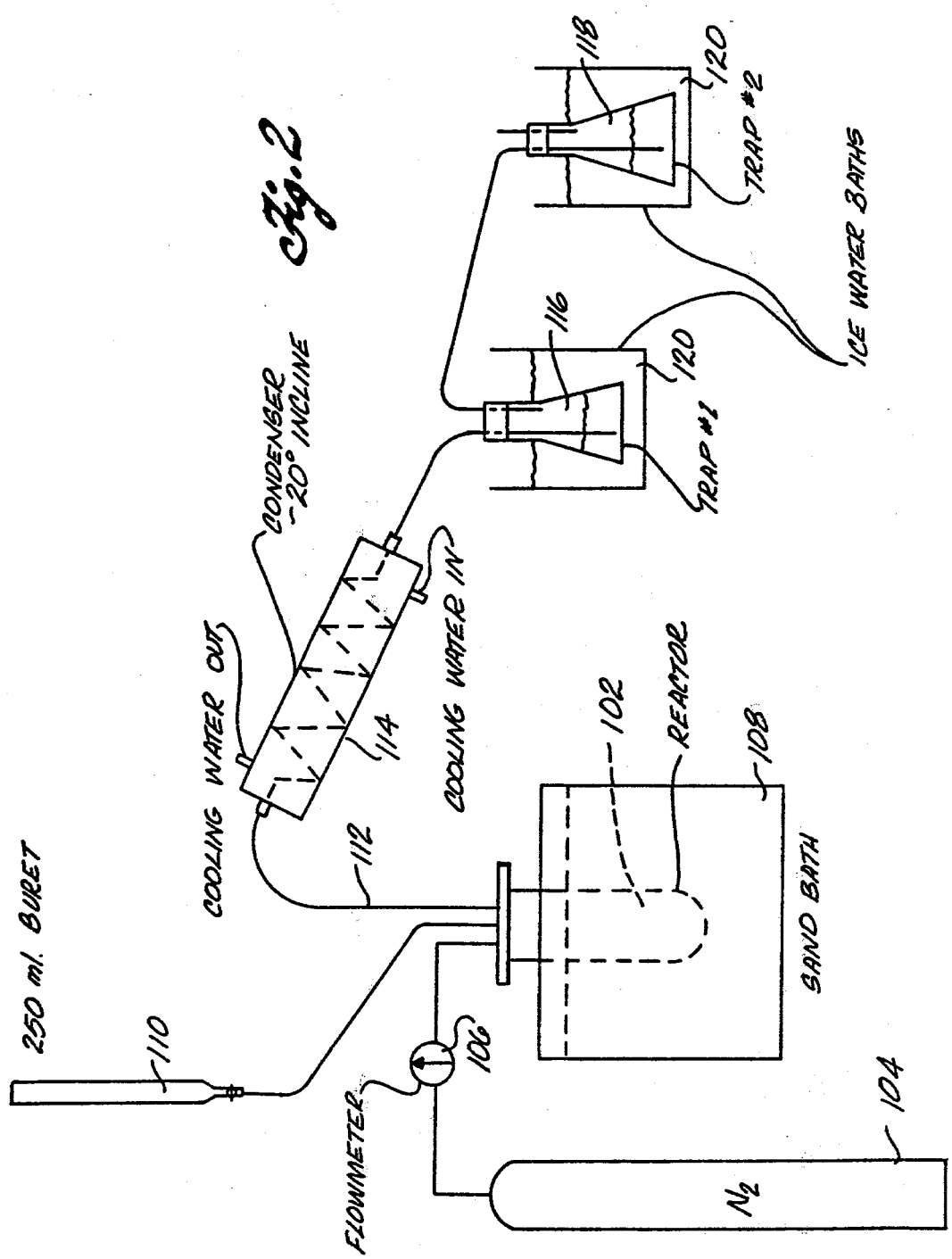

RECOVERY OF HYDROFLUORIC ACID FROM FLUOSILICIC ACID WITH HIGH PH HYDROLYSIS

CROSS-REFERENCES

This application is related to the following co-assigned and co-pending U.S. patent applications:

(1) Application Ser. No. 954,066 filed on Oct. 23, 1978 by Subhas K. Sikdar, entitled "Recovery of Hydrofluoric Acid from Fluosilicic Acid with High pH Hydrolysis";

(2) Patent application Ser. No. 953,801 filed on Oct. 23, 1978 by Subhas K. Sikdar and James H. Moore, entitled "Recovery of Hydrofluoric Acid from Fluosilicic Acid"; and (3) Application Ser. No. 953,803 filed on Oct. 23, 1978 by Subhas K. Sikdar entitled, "Recovery of Hydrofluoric Acid from Fluosilicic Acid".

BACKGROUND

Beneficiated phosphate rock from Florida typically contains 3 to 4% fluorine values. Phosphoric acid can be produced from this rock by treating it with sulfuric acid. Part of the fluorine present in the rock is evolved as silicon tetrafluoride and gaseous hydrofluoric acid, which upon scrubbing with pond water, form a dilute fluosilicic acid. By efficient design of scrubbers, it is possible to continuously produce a solution containing about 20% fluosilicic acid. The acid is usually contaminated with impurities, including 1,000 to 4,000 parts per million of $P_2O_5$.

It is desirable to recover the fluorine values present in the fluosilicic acid as anhydrous hydrofluoric acid. This is because hydrofluoric acid can be an important source of revenue. In addition, the presence of fluorine in the pond water can present an environmental pollution problem.

Many processes have been developed for concentration of dilute fluosilicic acid solutions, and preparation of hydrofluoric acid from the concentrated fluosilicic acid. Such attempts are described in U.S. Pat. Nos. 3,645,678; 3,645,679; 3,689,216; 3,855,399; 3,278,265; 3,218,124; 3,256,061; 3,140,152; 3,914,398; 3,537,817; 3,758,674; German Offen. Nos. 2,035,300, 2,032,855, and 2,248,149; and French Pat. No. 7,034,470. However, these processes suffer from one or more disadvantages. Disadvantages of these processes include operation at excessively high temperatures or under severe conditions, use of an excessive number of processing steps, consumption of uneconomical quantities of raw materials, production of undesirable byproducts, production of contaminated hydrogen fluoride, low yield of hydrogen fluoride, and considerable expenditure, both in terms of operating expense and initial capital investment. For example, U.S. Pat. Nos. 3,218,124 and 3,689,216 describe a process where fluosilicic acid solutions are treated with concentrated sulfuric acid to liberate silicon tetrafluoride and hydrogen fluoride, which are then separated. The silicon tetrafluoride is hydrolyzed to fluosilicic acid which is recycled and $SiO_2$ which is removed. Two disadvantages of this process are that a large volume of concentrated sulfuric acid is required per unit of fluosilicic acid and the splitting of the fluosilicic acid must be carried out at relatively high temperatures. This can result in severe corrosion of equipment.

U.S. Pat. No. 3,256,061 describes a process whereby fluosilicic acid is neutralized with ammonia, producing ammonium fluoride and silica. The silica is separated by filtration, and the ammonium fluoride is concentrated to a molten state constituting $NH_4F$—$NH_4HF_2$, which when treated with concentrated sulfuric acid produces hydrogen fluoride. Ammonia remains in the sulfuric acid and is sent to a phosphate acidulation unit. The chief drawbacks of this process are the requirement to recycle ammonia and the failure to remove any $P_2O_5$ impurity in the fluosilicic acid. A similar process is described in U.S. Pat. Nos. 3,914,398 and 3,537,817.

Therefore, there is a need for a simple, high yield process for recovering high purity hydrogen fluoride from phosphoric acid plant process streams.

SUMMARY OF THE INVENTION

The present invention is directed to a method with the above features for recovery of hydrogen fluoride from aqueous solutions of fluosilicic acid such as phosphate plant process streams. According to this process, an aqueous solution of fluosilicic acid is combined with sodium hydroxide for forming a first alkaline aqueous slurry comprising dissolved silica, precipitated sodium fluoride, and dissolved sodium fluoride. The pH of this first alkaline aqueous slurry is maintained at a value of from about 11 to about 14 so the first slurry contains precipitated sodium fluoride and substantially only dissolved silica. A first crop of precipitated sodium fluoride is recovered from the first slurry, leaving a first aqueous solution comprising silica and sodium fluoride.

The first solution is combined with sodium fluosilicate or fluosilicic acid or both for forming a second alkaline aqueous slurry comprising silica and dissolved sodium fluoride. The sodium fluosilicate can include sodium fluosilicate formed in the purification zone and the fluosilicic acid can be a phosphate plant process stream. To form precipitated amorphous silica in the precipitation zone, the pH of the second slurry is maintained at a value greater than 7 and up to about 9, the second slurry is maintained at least saturated with sodium fluoride, and the temperature of the second slurry is maintained substantially equal to its boiling point.

If the second slurry contains precipitated sodium fluoride, the sodium fluoride is dissolved by adding water to the second slurry. Then the precipitated amorphous silica is filtered from the second slurry, leaving a second aqueous solution which comprises a sodium fluoride. Sodium fluoride can be recovered from the second solution by evaporating water from the second solution, thereby precipitating sodium fluoride, and separating the precipitated sodium fluoride from the remaining solution. Recovered sodium fluoride can be reacted with sulfuric acid to generate hydrogen fluoride.

DRAWINGS

These and other features, aspects and advantages of the present invention will become more apparent upon consideration of the following description, appended claims, and accompanying drawings wherein:

FIG. 1 is a flowsheet of a process embodying features of the present invention; and FIG. 2 is a schematic drawing of equipment used for a test to demonstrate advantages of the present invention.

DESCRIPTION

With reference to FIG. 1, in a process according to the present invention, fluosilicic acid feed 10 and sodium hydroxide 24 are combined in a first precipitator 23. The reaction which occurs is:

$$Na_2SiF_6 + 6NaOH \rightarrow 6NaF \downarrow + Na_2SiO_3 + 3H_2O \qquad (1)$$

The fluosilicic acid feed can be a phosphoric acid plant process stream such as scrubber liquor. For this process to be economical, the scrubber liquor should contain at least 15% by weight fluosilicic acid, and preferably it contains at least 20% by weight fluosilicic acid. Such scrubber liquor can contain from 1,000 to 4,000 parts per million by weight $P_2O_5$ and other impurities.

Preferably the fluosilicic acid feed has few impurities because impurities can contaminate the silica and sodium fluoride process. Unlike the process described in the aforementioned application by Sikdar entitled "Production of Hydrofluoric Acid from Fluosilicic Acid", the process described herein does not have a purification step where the feed fluosilicic acid is treated with sodium sulfate.

It is important that the conditions in the first precipitator be maintained such that sodium fluoride is precipitated and silica remains in solution, so that the sodium fluoride can be separated from the first alkaline aqueous slurry. This is effected by maintaining the pH of the first slurry at a value of from about 11 to about 14, and preferably from about 13 to about 14. At pH values less than about 11, a substantial portion of the sodium fluoride can be left in solution and some silica may precipitate.

The temperature in the first precipitator can be from about 20° to about 80° C., and the pressure can be maintained at about ambient. At elevated temperatures or reduced pressures in the first precipitator 23, water vapor 25 can be given off. The water vapor is condensed in a condenser 26 with total reflux via line 27.

The first slurry is passed via line 28 to a first separation zone 29 in which precipitated sodium fluoride 30 is recovered, leaving an aqueous solution of sodium metasilicate 31.

The first separator, and all other separators described in this application, can be any suitable separation device such as a gravity sedimentation unit, a filtration unit, or a centrifuge. For example, the first separator 18 can be a cake filter, a pressure relief filter, or a vacuum drum filter.

The sodium metasilicate solution 31 is transferred to a second precipitator 32, which is agitated, in which it is combined with fluosilicic acid solution, sodium fluosilicate, or both 70. The fluosilicic acid preferably comprises at least a portion of the fluosilicic acid feed and can include a phosphoric acid plant process stream such as scrubber liquor. Preferably, the fluosilicic acid added to the second precipitator contains at least 15% by weight fluosilicic acid, and more preferably at least 20% by weight fluosilicic acid. The sodium fluosilicate added is preferably sodium fluosilicate separated in the first separator 29.

Exemplary of the reactions which occur in the second precipitation zone are:

$$3Na_2SiO_3 + H_2SiF_6 \rightarrow 6NaF + 4SiO_2 \downarrow + H_2O \qquad (2)$$

and $$2Na_2SiO_3 + Na_2SiF_6 \rightarrow 6NaF + 3SiO_2 \downarrow \qquad (3)$$

It is important that the conditions in the second precipitator or reactor be maintained such that amorphous silica is formed in the second precipitator, so that the silica can be separated from the sodium fluoride. If a silica gel or a silica sol is formed in the second precipitator 32, then it is extremely difficult, if not impossible, to separate the silica from the sodium fluoride. Amorphous silica is formed in the second precipitator by: (1) maintaining the pH of the second alkaline aqueous slurry at a value greater than 7 and up to about 9, (2) controlling the water content of the second alkaline aqueous slurry sufficiently low such that the second slurry is at least saturated with sodium fluoride, and (3) maintaining the temperature of the second alkaline aqueous slurry substantially equal to its boiling point. All three of these requirements must be satisfied, or else amorphous silica is not produced. The pH of the second alkaline aqueous slurry is maintained between 7 and 9 by controlling the amount of fluosilicic acid added to the second precipitator.

As used herein, by the term "amorphous silica" there is meant silica not having a characteristic x-ray diffraction pattern.

For example, if the pH in the second precipitator is less than 7, colloidal silica is formed, which cannot be filtered easily from sodium fluoride solution. If the pH of the second alkaline aqueous slurry in the second precipitator 32 is greater than or equal to 9 or less than 7, a high percentage of the formed silica is in solution, and thus cannot be separated from the sodium fluoride. Furthermore, when the pH of the slurry is less than 7, the precipitated silica is in the form of a difficult-to-filter gel.

Because the second slurry is maintained near or at its boiling point, water vapor is evolved. The water vapor as well as any other gases evolved are withdrawn from the second precipitator via line 33. The water vapor and other gases pass to a condenser 34 in which at least a portion of the water is condensed, and refluxed via line 35 to the second precipitator. Non-condensed vapors are withdrawn via line 36, and excess water, if any, is withdrawn from the system via line 37.

The slurry in the second precipitator is maintained under agitation to insure intimate mixing between the reactants, and to permit the precipitated silica to be withdrawn from the vessel as a portion of the slurry in line 39. The slurry in the first precipitator can also be maintained under agitation.

The sodium fluosilicate and fluosilicic acid preferably are added to the second precipitator in an amount about equal to stoichiometric. The sodium fluosilicate can be added to the second precipitator as a solid, or combined with water.

The residence time in the second precipitator is that amount which is sufficient for the reaction between the sodium metasilicate and sodium fluosilicate and fluosilicic acid to go to substantial completion.

Although this method has been described in terms of recovering silica from sodium fluosilicate, it is also useful for recovering silica from potassium fluosilicate or ammonium fluosilicate with an ammonium-containing compound. In general, the first precipitator can be used for reacting fluosilicic acid with MOH, where M is selected from the group consisting of sodium, potassium, and ammonium, thereby forming a first alkaline aqueous slurry comprising $M_2SiO_3$ and the precipitated fluoride salt, MF. The pH of the first alkaline aqueous slurry is maintained at a value between about 11 and 14. Precipitated MF is recovered from the first slurry leaving an aqueous solution of $M_2SiO_3$, which is reacted with $M_2SiF_6$ or fluosilicic acid or both in a second precipitator to form a second alkaline aqueous slurry comprising silica and the fluoride salt, MF. The pH of the second alkaline aqueous slurry is maintained at a value greater than 7 and up to about 9; the water content of the second alkaline aqueous slurry is maintained sufficiently low such that the slurry is at least saturated with the fluoride salt MF; and the temperature of the second alkaline aqueous slurry is maintained substantially equal to its boiling point, so that the second slurry contains precipitated amorphous silica. Although the following steps of a process according to this invention are described in terms of separating silica from a slurry containing sodium fluoride, the same steps can be used for separating amorphous silica from a slurry containing potassium fluoride or ammonium fluoride.

The slurry 39 withdrawn from the second precipitator contains precipitated amorphous silica and an aqueous solution of sodium fluoride. Generally, the slurry 39 also contains precipitated sodium fluoride. This is because if the second precipitator does not contain a saturated solution of sodium fluoride, amorphous silica is not formed in the second precipitator. Therefore, to be sure to avoid formation of non-amorphous silica, the second precipitator is conservatively operated so sodium fluoride precipitates.

If the second slurry contains precipitated sodium fluoride, it is desirable to dissolve this sodium fluoride to avoid contamination of the silica with sodium fluoride and to avoid low yields of hydrofluoric acid. Therefore, before separating the precipitated silica from the slurry 39, the slurry 39 is introduced to an agitated dissolver 40, where it is combined with water 42, which is preferably heated. Sufficient water is added to the dissolver to dissolve substantially all of the sodium fluoride. Slurry 44 containing precipitated amorphous silica and a solution of sodium fluoride is withdrawn from the dissolver 40 and is introduced to a second separator 46 from which the amorphous silica 48 is withdrawn as a product. A solution of sodium fluoride 50 is withdrawn from the second separator and is passed to an evaporator 52.

The amorphous silica produced by the process is described in the above-mentioned application Ser. No. 953,803, Oct. 23, 1978, filed by Sikdar and entitled "Recovery of Hydrofluoric Acid from Fluorsilicic Acid" is of high purity, generally containing less than 2% by weight fluorine. The silica has a surface area of 37 meters squared per gram, a density of from 1.59 to 1.82 grams per cubic centimeter, a pore volume of 0.23, and a loss on ignition of from 6.7 to 7.9% by weight. The weight average particle size has been found to be from about 15 microns to about 24 microns. Therefore, the silica can be easily separated from the sodium fluoride solution by passing the slurry 44 through a filter, which should have an average pore size of less than about 15 microns. It is expected that silica produced by the process described herein will have the same properties.

In the evaporator 52, water is removed from the sodium fluoride solution 50 to precipitate the sodium fluoride. This can be done under vacuum. Preferably, the removed water 54 is recycled to the dissolver 40 to provide the bulk of the water introduced to the dissolver. The remainder of the water added to the dissolver is provided by make-up water 56. The sodium fluoride slurry 58 is passed from the evaporator 52 to a third separator 60, where sodium fluoride solid 62 is recovered. Sodium fluoride solution 64 recovered from the third separator 60 can be recycled to the second precipitator 32 to recover the fluorine values contained therein.

Recovered sodium fluoride can be sold as a product, or can be used to produce hydrogen fluoride in a hydrogen fluoride generator 64. In the generator 64, sodium fluoride recovered in the second separator and/or sodium fluoride recovered in the third separator are combined with a stoichiometric amount of sulfuric acid 65 to produce hydrogen fluoride 66 and sodium sulfate 68.

It is important to avoid the presence of air in the generator to minimuze corrosion. The sodium sulfate 68 can be recovered as product.

The contents of the generator 64 preferably are a paste or thick slurry for high yield.

The sulfuric acid 65 added to the generator 64 can be 80% to 100% sulfuric acid. It has been noted that the concentration of the sulfuric acid used in this range has little, if any, effect on hydrogen fluoride yield.

Preferably a stoichiometric amount of sulfuric acid is used in the generator because it has been found that an excess of sulfuric acid reduces yield.

The higher the temperature in the generator, the higher the yield of hydrogen fluoride. However, as the temperature increases, problems with corrosion also increase. The temperature in the generator is maintained in the range of from 80° C. to 300° C., and preferably at about 200° C., for high yield with minimal corrosion.

It is preferred that the hydrogen fluoride generation reactor 64 be operated as a batch reactor to minimize corrosion problems, and to avoid leakage of sulfuric acid and/or hydrofluoric acid to the environment.

The method of this invention has many significant advantages compared to other processes available. For example, unlike most other processes described in the literature, this process does not depend upon the hydrolysis of gaseous silicon tetrafluoride. Therefore, no corrosive gases are handled until the hydrogen fluoride generation step. Thus, corrosion problems are minimized.

A further advantage of the present invention is that corrosion of equipment is minimized because all of the steps, except for the generation hydrogen fluoride, are carried out at relatively low temperatures.

A further advantage of the process is the last step, where sodium sulfate is produced as a by-product. Thermodynamic analysis indicates that the reaction between sodium fluoride and sulfuric acid is highly favorable and is less endothermic than the corresponding parallel reaction between calcium fluoride and sulfuric acid.

A further advantage of the process is that the precipitated amorphous silica is usable as a by-product.

These and other advantages of the present invention will become more apparent with respect to the following examples and controls:

CONTROL 1

(Production of silica sol or gel)

This test shows the importance of controlling pH and controlling reaction temperature when reacting sodium fluosilicate with sodium metasilicate to produce amorphous silica.

A series of batch hydrolysis tests are conducted for the reaction between sodium fluosilicate and sodium metasilicate. Enough water is initially present to dissolve all of the sodium fluoride produced by the reaction so that silica formed can be filtered and the sodium fluoride recovered from the filtrate. The reactants are added to an agitated vessel in installments and the pH is controlled at various values between 7 and 11. The reaction chamber is immersed in a constant temperature bath maintained at temperatures between 50° C. and 75° C.

Irrespective of the pH or the temperature maintained in the reaction vessel, the precipitate cannot be filtered in a reasonable length of time. A silica sol or gel is obtained below a pH of approximately 10. The sol goes through filter cloth or paper and the gel plugs the filter pores in a matter of seconds. Above a pH of 10, sometimes no precipitate at all forms.

CONTROL 2

(Post-Precipitation)

These tests demonstrate the importance of maintaining the pH of the slurry in the second precipitator at a value less than 9 when reacting sodium metasilicate with sodium fluosilicate.

Three tests are conducted with stoichiometric ratios of sodium fluosilicate and sodium metasilicate. The sodium metasilicate is added in 25%, 20%, and 15% solutions. The reaction vessel is supplied with a reflux condenser. After reaction for two to three hours, water is added to the vessel to dissolve any precipitated sodium fluoride. The slurry in the vessel is then filtered, with excellent filtration occuring. The precipitate formed is amorphous silica. However, the filtrate, when standing overnight, becomes milky and a gel settles at the bottom. The pH of the mother liquor is around 9 or 10. Thus, at these pH's, the mother liquor becomes supersaturated with amorphous silica, and on standing becomes unstable, thus leading to the post precipitation.

EXAMPLE 1

(Evaporation of water from sodium fluoride solution)

One thousand grams of saturated sodium fluoride solution are introduced to an evaporator. Five hundred grams of water are evaporated from the solution, thereby producing 27.5 grams of solid sodium fluoride.

EXAMPLE 2

(Evaporation of water from sodium fluoride solution)

Five hundred cubic centimeters of sodium fluoride solution were introduced to an evaporator maintained at a temperature of 100° C. 285 cc of water vapor were removed, producing 7.7 grams of solid sodium fluoride and 215 cc of liquor saturated with sodium fluoride.

EXAMPLE 3

(HF generation)

These tests were conducted to show the feasability of producing hydrogen fluoride from sodium fluoride. FIG. 2 shows a schematic of the experimental equipment used. Forty-two grams of sodium fluoride were pre-heated to a desired temperature in a Monel reactor 102. Nitrogen gas was passed from storage tank 104 through a flowmeter 106 into the reactor 102 to drive out any oxygen present to avoid corrosion problems.

The reactor was in a sand bath 108 to maintain the desired temperature in the reactor. After purging the nitrogen, sulfuric acid was introduced quickly into the reactor 102 from a buret 110. The reaction started immediately as evidenced by a large (sometimes 40° C.) drop in temperature. The product gas was led via line 112 to a water-cooled Monel condenser 114 into two serially connected caustic soda traps 116 and 118 kept in ice water baths 120. The first trap 116 contained a 20% solution of sodium hydroxide and the second trap 118 contained a 10% solution of sodium hydroxide. In the traps, the hydrogen fluoride reacted with the sodium hydroxide to produce sodium fluoride, which precipitated. About 5 minutes after the sulfuric acid addition, the nitrogen gas flow was resumed. The nitrogen gas assisted in carrying HF from the reactor. The sodium fluoride formed in the traps was filtered, washed with water and reagent alcohol, dried and weighed. At the completion of the reaction period, the contents of the reactor 102 were dissolved in water and analyses were conducted for sulfate and fluoride ions.

Eight tests were conducted. The reaction temperature, time of reaction, concentration of sulfuric acid, percent excess of sulfuric acid, flow rate of nitrogen, and yield for each test is presented in Table 1.

The results of the test were analyzed according to the Yates' method. Based on this analysis, the following conclusions were reached:

1. Flow of nitrogen did not have any influence on yield.

2. Time was not significant with regard to yield. This indicates that no further reaction takes place after the first hour of reaction since yield obtained was always less than 100%. This also indicates that diffusion limits the reaction. Therefore, some form of mixing is necessary to increase yield.

3. The strength of the sulfuric acid appears to have no influence on yield, i.e. 80% sulfuric acid seems to produce the same yield as 96.5% sulfuric acid.

4. Excess sulfuric acid appears to decrease yield.

5. Temperature is by far the most important variable affecting yield, with higher temperatures increasing yield.

TABLE 1

| Test | Reaction Temp. (°C.) | Reaction Time (Hr.) | $H_2SO_4$ Concentration (% wt.) | % Excess $H_2SO_4$ | $N_2$ Rate (Standard cc/min.) | Yield (% by Weight) |
|---|---|---|---|---|---|---|
| 3 A | 150 | 1 | 80 | 0 | 100 | 23.7 |
| 3 B | 200 | 1 | 80 | 2 | 100 | 32.9 |
| 3 C | 150 | 2 | 80 | 2 | 300 | 18.9 |
| 3 D | 200 | 2 | 80 | 0 | 300 | 49.9 |
| 3 E | 150 | 1 | 95 | 2 | 300 | 24.2 |
| 3 F | 200 | 1 | 95 | 0 | 300 | 41.1 |
| 3 G | 150 | 2 | 95 | 0 | 100 | 33.6 |
| 3 H | 200 | 2 | 95 | 2 | 100 | 40.2 |

EXAMPLE 4

(HF generation)

In one set of two experiments either of 80% or 96.5% $H_2SO_4$ at 100% excess was used. The reaction mixture was prepared at 0° C. in an ice bath and then the reactor was assembled. The heating then was started and nitrogen flow was turned on. A final temperature of about 160° C. was obtained after about five (5) hours. The yield with 80% $H_2SO_4$ was 83.3% while that with 96.5% was 78%.

EXAMPLE 5

(HF generation)

In a variation of Example 4, a condensor was mounted vertically on the reactor to act as a reflux condenser. Thus only HF was allowed to leave the reactor. Severe corrosion resulted. Nevertheless the yield was consistently around 80%.

EXAMPLE 6

(HF generation)

An attempt was made to reach stoichiometric yield. A platinum crucible was used to effect the reaction. The yield was calculated from F analysis of the solution made by dissolving the solid residue in a definite quantity of water. Two experiments were carried out. The yields were 95.6 and 97.4%.

Based on the tests with generation of hydrogen fluoride from sulfuric acid and sodium fluoride, it was concluded that corrosion can limit the extent of reaction and mixing of the reactants can improve yield.

Although this process has been described in considerable detail with reference to certain versions thereof, other versions are possible. Therefore, the spirit and scope of the appended claims should not be limited to the description of the preferred versions contained herein.

What is claimed is:

1. A method for recovering sodium fluoride and solid amorphous silica from an aqueous solution of fluosilicic acid comprising the steps of:
   (a) reacting in a first precipitation zone fluosilicic acid in aqueous solution with sufficient sodium hydroxide to form a first alkaline aqueous slurry having a pH of from about 11 to about 14 and comprising sodium metasilicate and precipitated sodium fluoride;
   (b) recovering precipitated sodium fluoride from the first alkaline aqueous slurry leaving an aqueous solution comprising sodium metasilicate;
   (c) combining the aqueous solution comprising sodium metasilicate in a second precipitation zone with fluosilicic acid or sodium fluosilicate or both to form a second alkaline aqueous slurry comprising amorphous silica and dissolved sodium fluoride by maintaining the pH of the second alkaline aqueous slurry at a value greater than 7 and up to about 9; the second alkaline aqueous slurry being at least saturated with sodium fluoride, and the temperature of the second alkaline aqueous slurry being substantially equal to its boiling point so that the second alkaline aqueous slurry contains precipitated amorphous silica;
   (d) separating precipitated amorphous silica from the second alkaline aqueous slurry leaving an aqueous solution of sodium fluoride; and
   (e) recovering sodium fluoride from the aqueous solution of sodium fluoride.

2. The method of claim 1 in which the second alkaline aqueous slurry contains precipitated sodium fluoride, and including the step of adding water to the second alkaline aqueous slurry in a dissolving zone to dissolve substantially all of the precipitated sodium fluoride before the step of separating amorphous silica from the second alkaline aqueous slurry.

3. The method of claim 2 in which the step of recovering sodium fluoride from the aqueous solution of sodium fluoride comprises evaporating water from the aqueous solution of sodium fluoride in an evaporation zone to form a third aqueous slurry comprising solid sodium fluoride and a saturated solution of sodium fluoride.

4. The method of claim 3 including the step of recycling at least a portion of the evaporated water to the dissolving zone.

5. The method of claim 3 including the step of passing the third aqueous slurry from the evaporation zone to a separation zone to separate solid sodium fluoride from the saturated solution of sodium fluoride.

6. The method of claim 5 including the step of passing at least a portion of the saturated solution of sodium fluoride from the separation zone to the second precipitation zone.

7. The method of claim 1 in which the step of recovering sodium fluoride from the aqueous solution of sodium fluoride comprises evaporating water from the aqueous solution of sodium fluoride in an evaporation zone to form a third aqueous slurry comprising solid sodium fluoride and a saturated solution of sodium fluoride.

8. The method of claim 1 including the additional step of reacting recovered sodium fluoride with sulfuric acid in a hydrogen fluoride generation zone maintained at a temperature of at least about 80° C. to form hydrogen fluoride and sodium sulfate.

9. The method of claim 1 including the steps of evaporating water from the second alkaline aqueous slurry contained in the second precipitation zone condensing the evaporated water, and refluxing at least a portion of the condensed water to the second precipitation zone.

10. The method of claim 1 in which the aqueous solution of fluosilicic acid is scrubber liquor from a phosphate plant, wherein the scrubber liquor contains at least 15% by weight fluosilicic acid and from about 1,000 to about 4,000 parts per million $P_2O_5$.

11. The method of claim 10 in which such scrubber liquor is introduced to the second precipitation zone.

12. A method for recovering solid amorphous silica from a fluosilicate salt comprising the steps of:
   (a) reacting fluosilicic acid with MOH, where M is selected from the group consisting of sodium, potassium, and ammonium, to form a first alkaline aqueous slurry having a pH of from about 11 to about 14 and comprising precipitated fluoride salt MF and dissolved $M_2SiO_3$;
   (b) separating precipitated fluoride salt from the first alkaline aqueous leaving a first aqueous slurry solution comprising $M_2SiO_3$;
   (c) combining the first aqueous solution with fluosilicic acid or $M_2SiF_6$ or both to form a second alkaline aqueous slurry comprising silica and the fluoride salt MF; wherein the pH of the second alkaline aqueous slurry is maintained at a value greater than 7 and up to about 9, the water content of the second alkaline aqueous slurry is maintained sufficiently low such that the slurry is at least saturated with the fluoride salt, and the temperature of the second alkaline aqueous slurry is maintained substantially equal to its boiling point so that the second slurry contains precipitated amorphous silica; and
   (d) separating precipitated amorphous silica from the second alkaline aqueous slurry.

13. The method of claim 12 in which the precipitated amorphous silica is separated from the second alkaline aqueous slurry by filtering the slurry through a filter having an average pore size less than about 15 microns.

14. The method of claim 12 in which at least 50% by weight of the separated amorphous silica has a diameter greater than about 15 microns.

15. A method for recovering hydrogen fluoride and solid amorphous silica from phosphate plant scrub liquor comprising at least 15% by weight fluosilicic acid and at least 1000 parts per million $P_2O_5$, comprising the steps of:
   (a) combining the scrub liquor with sodium hydroxide in a first precipitation zone to form a first alkaline aqueous slurry having a pH of from about 11 to about 14 and comprising dissolved sodium metasilicate and precipitated sodium fluoride;
   (b) recovering precipitated sodium fluoride from the first alkaline aqueous slurry in a first separation zone leaving an aqueous solution of sodium metasilicate;
   (c) combining the aqueous solution of sodium metasilicate with scrub liquor and sodium fluosilicate in a second precipitation zone to form a second alkaline aqueous slurry comprising silica and dissolved sodium fluoride; wherein the pH of the second alkaline aqueous slurry is maintained at a value greater than 7 and up to about 9, the water content of the second alkaline aqueous slurry is maintained sufficiently low such that the second slurry contains solid sodium fluoride, and the temperature of the second alkaline aqueous slurry is maintained substantially equal to its boiling point so that the second slurry contains precipitated amorphous silica;
   (d) adding sufficient water to the second alkaline aqueous slurry in a dissolving zone to dissolve substantially all of the solid sodium fluoride; and thereafter
   (e) separating precipitated amorphous silica from the second alkaline aqueous slurry leaving an aqueous solution of sodium fluoride;
   (f) evaporating water from the aqueous solution of sodium fluoride in an evaporation zone to form a third aqueous slurry comprising solid sodium fluoride and a saturated solution of sodium fluoride;
   (g) recycling at least a portion of the evaporated water to the dissolving zone;
   (h) passing the third aqueous slurry from the evaporation zone to a second separation zone to recover solid sodium fluoride form the third aqueous slurry leaving a saturated solution of sodium fluoride;
   (i) introducing at least a portion of the saturated solution of sodium fluoride from the second separation zone to the second precipitation zone;
   (j) reacting recovered solid sodium fluoride with sulfuric acid in a hydrogen fluoride generation zone maintained at a temperature of at least about 80° C. to form hydrogen fluoride and sodium sulfate; and
   (k) recovering hydrogen fluoride formed in the generation zone.

16. The method of claim 15 in which sodium fluoride recovered in the first and second separation zones is reacted with sulfuric acid in the hydrogen fluoride generation zone.

17. A method for recovering sodium fluoride and solid amorphous silica from an aqueous solution comprising at least 15% by weight fluosilicic acid comprising the steps of:
   (a) reacting fluosilicic acid in such an aqueous solution with sufficient sodium hydroxide in a precipitation zone to form a first alkaline aqueous slurry having a pH of at least about 11 and up to about 14, the first alkaline aqueous slurry comprising dissolved sodium metasilicate and precipitated sodium fluoride;
   (b) recovering precipitated sodium fluoride from the first alkaline aqueous slurry leaving an aqueous solution comprising sodium metasilicate;
   (c) combining the aqueous solution of sodium metasilicate with fluosilicic acid or sodium fluosilicate or both in a reaction zone to form a second alkaline aqueous slurry comprising sodium fluoride and precipitated, filterable amorphous silica by the steps of:
      (i) maintaining the pH of the second alkaline aqueous slurry at a value greater than 7 and up to about 9;
      (ii) maintaining the water content of the second alkaline aqueous slurry sufficiently low such that the second slurry is at least saturated with sodium fluoride; and
      (iii) maintaining the temperature of the second alkaline aqueous slurry substantially equal to its boiling point;
   (d) filtering precipitated amorphous silica from the second alkaline aqueous slurry leaving an aqueous solution of sodium fluoride; and
   (e) recovering sodium fluoride from the aqueous solution of sodium fluoride.

18. The method of claim 17 in which the second alkaline aqueous slurry contains precipitated sodium fluoride, and including the step of adding water to the second alkaline aqueous slurry in a dissolving zone to dissolve substantially all of the precipitated sodium fluoride before the step of filtering amorphous silica from the second alkaline aqueous slurry.

19. The method of claim 18 in which the step of recovering sodium fluoride from the aqueous solution of sodium fluoride comprises evaporating water from the aqueous solution in an evaporation zone to form a third aqueous slurry comprising solid sodium fluoride and a saturated solution of sodium fluoride.

20. The method of claim 19 including the step of recycling at least a portion of the evaporated water to the dissolving zone.

21. The method of claim 19 including the step of passing the third aqueous slurry from the evaporation zone to a separation zone to separate solid sodium fluoride from the saturated solution of sodium fluoride.

22. The method of claim 21 including the step of passing at least a portion of the saturated solution of sodium fluoride from the separation zone to the reaction zone.

23. The method of claim 17 in which the step of recovering sodium fluoride from the aqueous solution of sodium fluoride comprises evaporating water from the aqueous solution of sodium fluoride in an evaporation zone to form a third aqueous slurry comprising solid sodium fluoride and a saturated solution of sodium fluoride.

24. The method of claim 17 including the additional step of reacting recovered sodium fluoride with sulfuric acid in a hydrogen fluoride generation zone maintained at a temperature of at least about 80° C. to form hydrogen fluoride and sodium sulfate.

25. The method of claim 24 in which sodium fluoride recovered from both the first alkaline aqueous slurry and the second alkaline aqueous slurry is reacted with sulfuric acid in the hydrogen fluoride generation zone.

26. The method of claim 17 including the steps of evaporating water from the second alkaline aqueous slurry in the reaction zone, condensing the evaporated water, and refluxing at least a portion of the condensed water to the reaction zone.

27. The method of claim 17 in which the aqueous solution comprising fluosilicic acid is a process stream from a phosphate plant, where the process stream contains from about 1,000 to about 4,000 parts per million $P_2O_5$.

28. The method of claim 27 in which such a process stream is introduced into the reaction zone.

29. The method of claim 17 in which the sodium hydroxide is introduced to the precipitation zone in solution, the solution containing from about 10 to about 50% by weight of sodium hydroxide.

* * * * *